(12) United States Patent
Jones, III

(10) Patent No.: US 8,504,493 B2
(45) Date of Patent: Aug. 6, 2013

(54) SELF-ORGANIZING SEQUENTIAL MEMORY PATTERN MACHINE AND REINFORCEMENT LEARNING METHOD

(75) Inventor: Robert Linzey Jones, III, Toano, VA (US)

(73) Assignee: Sigma Space Corporation, Lanham, MD (US)

( * ) Notice: Subject to any disclaimer, the term of this patent is extended or adjusted under 35 U.S.C. 154(b) by 332 days.

(21) Appl. No.: 13/027,458

(22) Filed: Feb. 15, 2011

(65) Prior Publication Data

US 2012/0209794 A1    Aug. 16, 2012

(51) Int. Cl.
*G06F 15/18*    (2006.01)
(52) U.S. Cl.
USPC .......................................................... 706/12
(58) Field of Classification Search
None
See application file for complete search history.

(56) References Cited

U.S. PATENT DOCUMENTS

| | | | |
|---|---|---|---|
| 6,601,049 B1 * | 7/2003 | Cooper .......................... | 706/15 |
| 7,613,675 B2 | 11/2009 | Hawkins et al. | |
| 7,624,085 B2 | 11/2009 | Hawkins et al. | |
| 7,739,208 B2 | 6/2010 | George et al. | |
| 8,306,931 B1 * | 11/2012 | Bowman et al. ................ | 706/27 |
| 2010/0023307 A1 * | 1/2010 | Lee et al. ........................... | 703/7 |
| 2010/0257866 A1 * | 10/2010 | Schneegass et al. ............ | 60/773 |

OTHER PUBLICATIONS

U.S. Appl. No. 12/355,679, filed Jul. 22, 2010, Niemasik et al.
I. Arel, D.C. Rose, T.P. Karnowski, "Deep machine learning—a new frontier in artificial intelligence research," IEEE Comput. Intell. Mag., vol. 5, No. 4, pp. 13-18, 2010.

U.S. Appl. No. 11/622,458, filed Aug. 16, 2007, George et al.
U.S. Appl. No. 12/576,966, filed Feb. 25, 2010, Jaros et al.
U.S. Appl. No. 12/483,642, filed Dec. 17, 2009, Hawkins et al.
U.S. Appl. No. 12/402,261, filed Sep. 24, 2009, Sayfan et al.
U.S. Appl. No. 12/053,204, filed Sep. 24, 2009, George et al.
U.S. Appl. No. 12/315,957, filed Jun. 11, 2009, George.
U.S. Appl. No. 12/147,348, filed Jan. 1, 2009, Jaros et al.
U.S. Appl. No. 12/148,141, filed Nov. 27, 2008, Czora.
U.S. Appl. No. 12/029,434, filed Aug. 28, 2008, Edwards et al.
U.S. Appl. No. 12/039,652, filed Aug. 28, 2008, George et al.
U.S. Appl. No. 12/039,630, filed Aug. 28, 2008, Jaros et al.
U.S. Appl. No. 12/052,580, filed Jul. 31, 2008, Hawkins et al.
U.S. Appl. No. 11/351,437, filed Aug. 16, 2007, Hawkins et al.
U.S. Appl. No. 11/680,197, filed Aug. 16, 2007, Marianetti, II et al.
U.S. Appl. No. 11/147,069, filed Jan. 4, 2007, George et al.
U.S. Appl. No. 11/010,243, filed Aug. 17, 2006, Hawkins.

* cited by examiner

*Primary Examiner* — Kakali Chaki
*Assistant Examiner* — Michael Zidanic
(74) *Attorney, Agent, or Firm* — Miodrag Cekic Intellectual Property Strategists, LLC

(57) ABSTRACT

A self-organizing computing machine utilizes a method for mapping from a plurality of patterns contained within provided inputs to an invariant perception, distinguishable by a name or a label. The self-organizing computing machine includes a network of at least three nodes arranged in at least two hierarchical levels, at least one feature extractor, and at least one output unit arranged to interface the invariant perception. The nodes may include a reinforcement learning sub-network combined with an ensemble learning sub-network. The reinforcement learning sub-network may be arranged to receive at least two correlants, to determine a plurality of output values and to output the output values to the nodes of the higher level and the nodes of the lower level. Also, the ensemble learning sub-network may be arranged to receive and to combine output values from nodes of the higher level and nodes of the lower level.

29 Claims, 13 Drawing Sheets

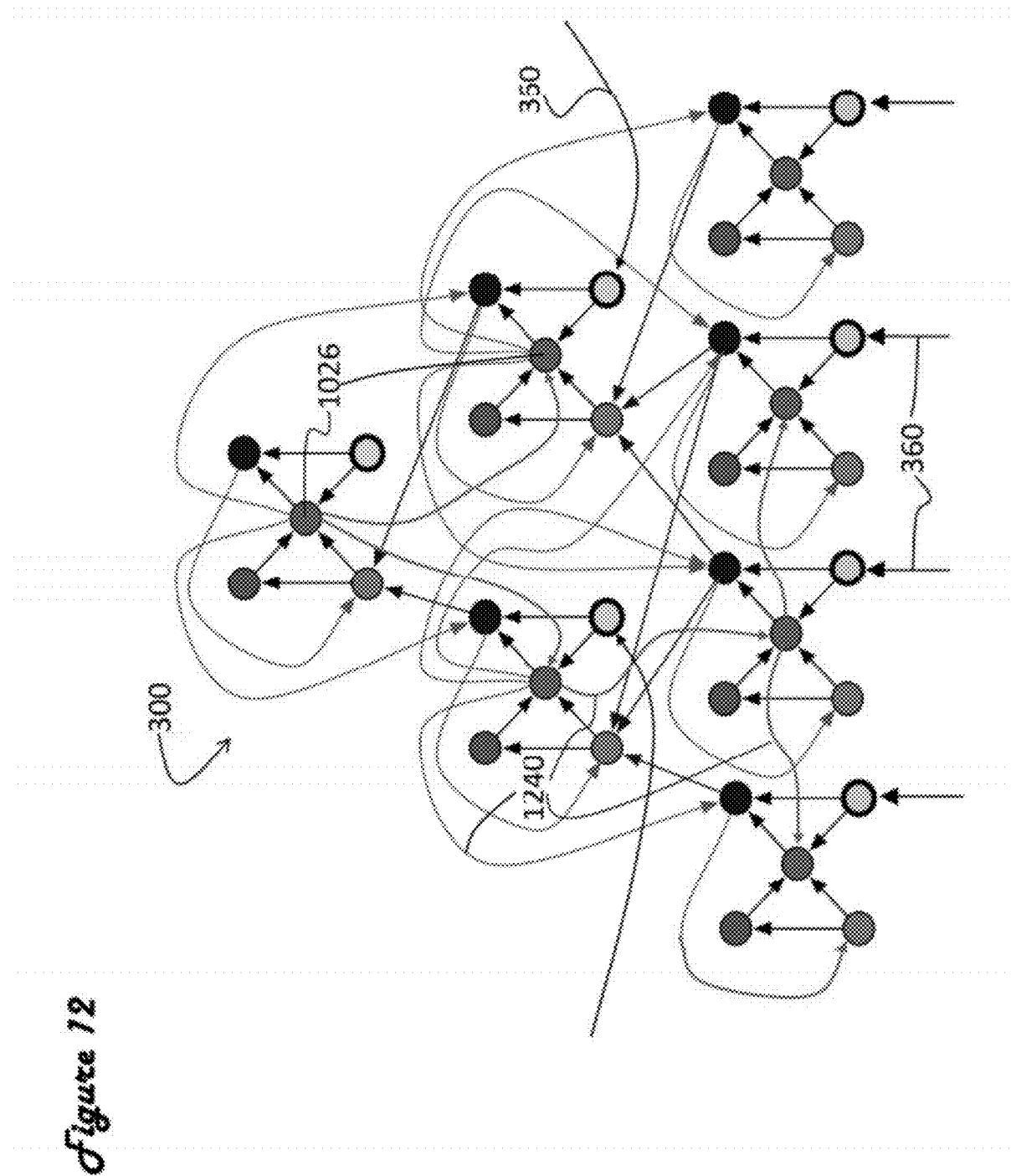

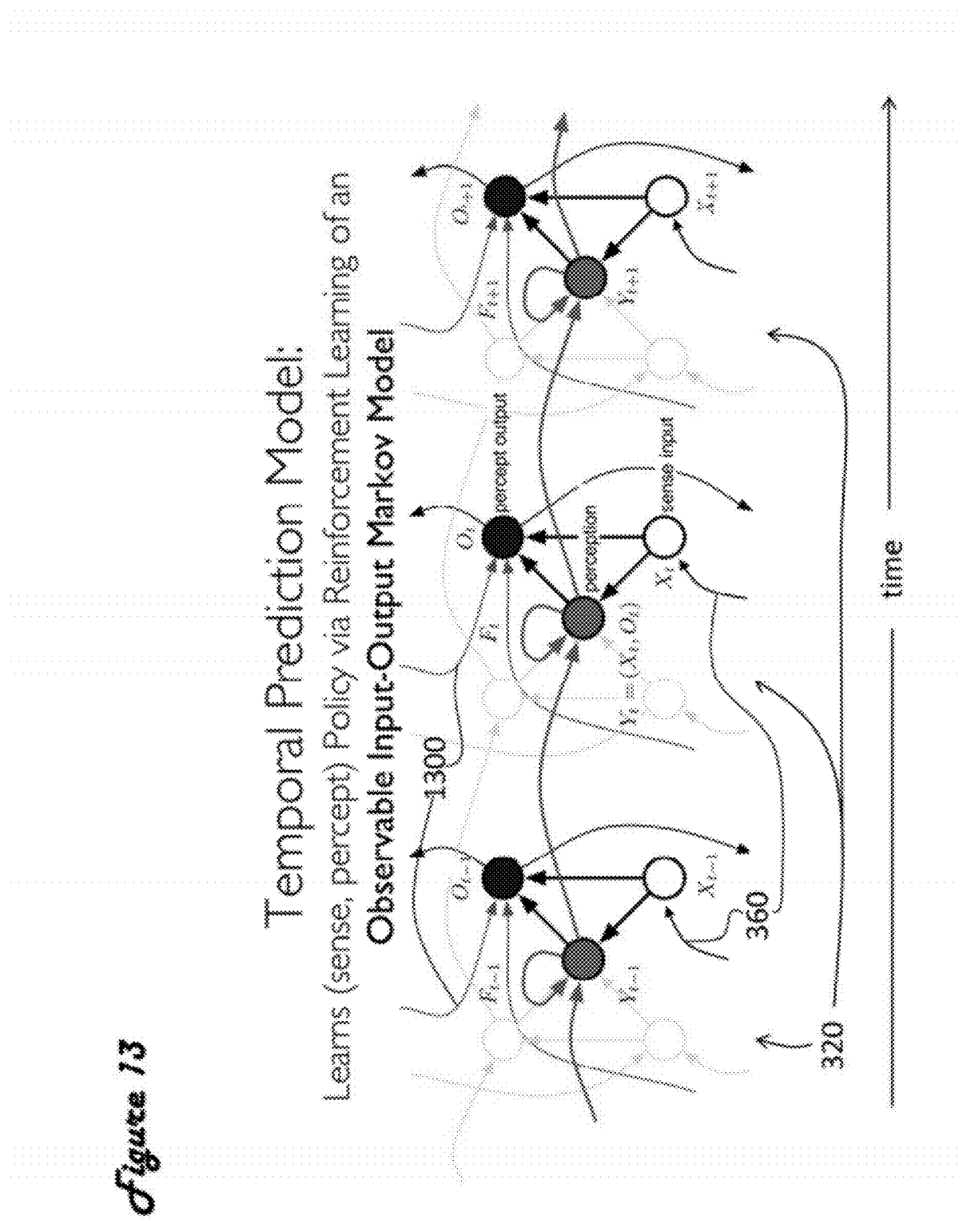

SELF-ORGANIZING SEQUENTIAL MEMORY PATTERN MACHINE AND REINFORCEMENT LEARNING METHOD

FIELD OF THE INVENTION

The invention relates generally to a self-organizing sequential memory pattern computing machine, its structure, learning and operating algorithms, methods of operation, and exemplary applications involving self-organized pattern recognition and classification.

BACKGROUND OF THE INVENTION

The instant invention pertains to pattern classification and categorical perception of real-world sensory phenomena. In the current case, the invention learns a mapping from the patterns found within at least one predetermined set of provided inputs including but not limited to sensory observations, measurements resulting from various measurement systems, simulated or processed signals resulting from various models, and/or compilations of the above inputs, to at least one invariant perception, which may be then given a name, or label, among discrete categories. In general, such a problem may be challenging to solve or advance toward a rational set of acceptable solutions, since the available sets of inputs (labeled below as "correlants") containing information on systems of interest under observation (below identified by labels "reality", "real objects", "real world", or simply "world") may incorporate an unknown measure of random or systemic portions not pertinent or correlated to the features of interest of the observed reality. It may be already a part of practitioners' experience that variable irreducible portions of error inputs accompany virtually all input sets frequently representing generally accepted feature in the fields of measurements and observations that, in general, the world may be a random and noisy place.

This, inter alia, may make it hard for a system or a device arranged to perform at least one world-related task or acquire, store, and exchange world-pertinent information (indicated by "a machine") to detect and classify an event or an object (for example the identity of a person's face) even when viewed from different angles. More particularly, a machine arranged to detect patterns in the world-pertinent information and use it for subsequent classifications is indicated by the designation "a pattern machine". Nevertheless, even more complex machine-executable tasks such is to recognize that distinct objects share certain common spatial-spectral features and can be so classified (e.g. as bike, car, truck, or plane); or to determine that distinct sounds share certain temporal-spectral feature can be so classified (e.g. as words, phrases, and more complex speech patterns) are desirable in a plurality of applications subjects to current research activities or even prototypical test implementations.

Generally, many of the above machine-executable tasks, if taken separately, can be treated as a many-to-one mapping which may represent a complex problem to solve. But one may be focused on the even more challenging problem of learning a many-to-many mapping of a sensory continuum of any number of sensor modalities to a discrete space of labels of any fixed size. A prior art approach to similar tasks based on a "mixture of experts" where each many-to-one sub problem is trained separately and then combined linearly to solve the large many-to-many mapping is not part of the current invention. Such an approach may be folly, as it would fail to recognize and reuse the recurring patterns that many distinct objects or observations share; and so it may not be efficient enough (neither statically or computationally) to scale up to increasingly more complex, real-world problems; and it may not allow pooling of evidence to either support or refute competing hypotheses about the perceived invariance. The latter may be very significant, as it may be enabling to being able to reason under increased uncertainty, which may be done consistently and with optimized expected error by doing so within a Bayesian framework. Thus, present invention approaches this problem using well known Bayesian statistical inference, but with the help of well defined newly-developed tools in information theory, probability theory, and the theory of fixed points, combined in a novel way to solve this invariant mapping problem.

Therefore, the current invention realizes an original paradigm for semi-supervised categorical perception as an invariance learning pattern machine. The new paradigm is novel, inter alia, in how it combines ensemble learning (also known as variational Bayesian inference) with reinforcement learning in a dynamic Bayesian network. Ensemble learning, also called variational Bayes, is a family of algorithms for approximating the solution of fully Bayesian network models where the integrals involved are intractable. Ensemble learning methods are approximate, but provide a lower bound on the marginal likelihood that is multiplied with the prior to form the posterior used for prediction, PY. This allows the normalization or weighting of several hypothesized models for the purposes of model selection, which is then naturally built into the model.

The structure of dynamic Bayesian network is also novel, which may be also enabling for capturing the multiscale, self-similar structure of features typically found in real-world features. Also, it is understood that the current invention may approximate and represent a step in a direction of achieving a universal pattern machine which may be similar in structure and may execute processes which approximate and may be compared to processes as performed by a neocortex portion of human brain.

In contrast with the current invention, one problem with most known artificial intelligence (AI) and machine learning (ML) solutions of prior art is that learning is usually based on strict assumptions about the problem with algorithms built from overly rigid, non-adaptive rules for mapping prearranged information extracted from input signals (correlants) to desired output responses (classification targets). In addition, there are usually only two types of AI and/or ML solutions: supervised and unsupervised. The former requires that data be labeled with its corresponding target, which may be hard to obtain. So, training is usually limited, which may lead to insufficient performance. Moreover, such solutions may be too inflexible when given novel data that, in the real world, have non-stationary statistics, may be very noisy, and may tend to violate simplifying assumptions. So, again, the solution may perform inadequately in part because it may fail to adapt to an uncertain and time-dependent environment. On the other side, unsupervised learning solutions may not require labeled data, but their applicability may be limited to data density estimation and data clustering as a relatively limited part of a larger pattern classification solution; as opposed to providing a robust solution by itself. While these diametric solutions may be successful on certain problems for which each may be customized, none of them merit the designation "pattern machine" in the sense we indicated above. Many of them may have shortcomings that may prevent success on the complex problem of categorical perception. This, at least some embodiments of the machine of the current invention are conceptualized and arranged to be examples of a pattern machine for solving categorical perception problems.

AI and/or ML prior art has traditionally been based on pre-formulated rules frequently lacking flexibility necessary to learn and predict satisfactorily under dynamic conditions. The relevant problems may be inherently non-stationary, as the world is a random place. Furthermore, it also may be inherent in a structured world that the rules may change, evolve, or morph. A pattern machine can perform pattern classification by taking and including cues from the hierarchical structure of spatiotemporal features and patterns of correlants. The multiscale structure of correlants may have sequential vs. coincidental nature in time. That is, information may be embedded and conveyed in both space and time, simultaneously with and without redundancy. So, some embodiments of current inventions are structured such that one dimension or scale may not be favored over another when extracting any or all information. At least in part because of these requirements, many embodiments of the current invention extract and process information both simultaneously and sequentially in space and time, all in a concerted effort to correlate the extracted information to invariant patterns. At least related to these features, practices and structures of known prior art does not treat such problems as embodiments of present invention do.

SUMMARY OF THE INVENTION

The present invention is directed to a self-organizing computing machine and a method for mapping from a plurality of patterns contained within at least one predetermined set of provided inputs to at least one invariant perception, distinguishable by a name or a label, among a plurality of categories. The self-organizing computing machine includes: at least one network of at least three nodes arranged in at least two hierarchical levels including at least a lower level and a at least a higher level; at least one feature extractor arranged receive the at least one predetermined set of provided inputs, to process the at least one predetermined set of provided inputs to determine at least one hierarchical set of at least two correlants commensurate with the at least two hierarchical levels, and to communicate the determined hierarchical sets of at least two correlants to the at least two distinct nodes of the at least two distinct hierarchical levels commensurate with the at least two correlants; and at least one output unit arranged to interface the at least one invariant perception distinguishable, by a name or a label, among the plurality of categories. The at least one node at each hierarchical level comprises at least one reinforcement learning sub-network combined with at least one ensemble learning sub-network. The at least one reinforcement learning sub-network has been arranged to receive the commensurate correlants of the hierarchical sets of at least two correlants, to determine a plurality of output values and to output the output values from the determined plurality of output values to the nodes of the higher level and the nodes of the lower level. Also, the at least one ensemble learning sub-network has been arranged to receive and to combine at least one output value from the at least one node of the higher level and to receive and to combine at least one output value from the at least one node of the lower level.

The present invention is also directed to a self-organizing computing process for mapping from a plurality of patterns contained within at least one predetermined set of provided inputs to at least one invariant perception distinguishable, by a name or a label, among a plurality of categories. The self-organizing computing process includes steps of: a) providing at least one self-organizing computing machine incorporating at least one network of at least three nodes arranged in at least two hierarchical levels including at least a lower level and a higher level; at least one feature extractor for receiving the at least one predetermined set of provided inputs, processing the at least one predetermined set of provided inputs to determine a hierarchical set of at least two correlants commensurate with the at least two hierarchical levels, and communicating the determined hierarchical sets of at least two correlants to the at least two distinct nodes of the at least two distinct hierarchical levels commensurate with the at least two correlants; at least one output unit for interfacing the at least one output one invariant perception distinguishable, by a name or a label, among categories; wherein, the at least one node at each hierarchical level includes at least one reinforcement learning sub-network combined with at least one ensemble learning sub-network; wherein, the at least one reinforcement learning sub-network have been arranged to receive the commensurate correlants of the hierarchical sets of at least two correlants, to determine a plurality of output values and to output the output values from the determined plurality of output values to the nodes of the higher level nodes and the nodes of the lower level; and wherein, the at least one ensemble learning sub-network has been arranged to receive and to combine at least one output value from the at least one node of the higher level and to receive and combine at least one output value from the at least one node of the lower level. Also, the self-organizing computing process in accordance with the present invention includes steps of: b) providing at least one predetermined initial set of inputs, to the at least one feature extractor and determining the hierarchical set of at least two correlants commensurate with the at least two hierarchical levels, c) communicating the determined hierarchical sets of at least two correlants to the at least two distinct nodes of the at least two distinct hierarchical levels commensurate with the at least two correlants, d) determining at least one output value from each of the at least two distinct nodes and providing the determined output values from each node to proximal nodes of the at least one network of the at least one self-organizing computing machine, and, after a predetermined time period, e) providing at least another subsequent set of inputs, to the at least one feature extractor and determining the hierarchical set of at least two subsequent correlants commensurate with the at least two hierarchical levels. Further, the self-organizing computing process in accordance with the present invention includes steps of: f) communicating the determined hierarchical sets of at least two subsequent correlants to the at least two distinct nodes of the at least two distinct hierarchical levels commensurate with the at least two subsequent correlants, g) determining at least one subsequent output value from each of the at least two distinct nodes and providing the determined subsequent output values from each node to proximal nodes of the at least one network of the at least one self-organizing computing machine, and h) determining, based on the at least one subsequent output value of the at least one updated invariant perception distinguishable, by a name or a label, among categories. In addition, the self-organizing computing process in accordance with the present invention includes steps of: i) repeating sequentially steps c)-h) for another predetermined time period, or for a duration of time necessary to achieve a predetermined convergence of the at least one subsequent output value of a preselected node of the at least one network, and j) interfacing the at least one updated invariant perception distinguishable, by a name or a label, among categories.

BRIEF DESCRIPTION OF THE DRAWINGS

FIG. 12 is a diagram of yet another exemplary embodiment of the present invention.

FIG. 13 is a diagram of yet another exemplary embodiment of the present invention.

DETAILED DESCRIPTION

In the following description of embodiments of the present invention, numerous specific exemplary details are set forth in order to provide a more thorough understanding of the present invention. However, it will be apparent to one skilled in the art that the present invention may be practiced without one or more of these exemplary details. In other instances, well-known features of prior art have not been described in detail to avoid unnecessarily complicating the description. For example, many embodiments and exemplary applications are based on a self-organizing computing machine, incorporating at least one data professor arranged and programmed substantially in analogy with human perception processes as presently understood. These embodiments may benefit from relative ubiquity of such processes and familiarity of practitioners with it at least from personal experiences, although the understanding that underlying principles may be used pertinent to more general sets of correlants and output responses is generally implied.

Historically, at least some classes of memory pattern machines were inspired and/or arranged to correspond to arrangements and methods believed to be pertinent to human perception, classification, and analysis of the real word. One useful review of certain aspects of advanced pattern machine research and pertinent References can be found in recent publication of I. Arel et al. in IEEE Computational Intelligence Magazine [I. Arel, D. C. Rose, T. P. Karnowski, "Deep machine learning—a new frontier in artificial intelligence research," *IEEE Comput. Intell. Mag.*, vol. 5, no. 4, pp. 13-18, 2010] ("Arel") which is incorporated here in its entirety (including the References in page 18).

Figure 1:
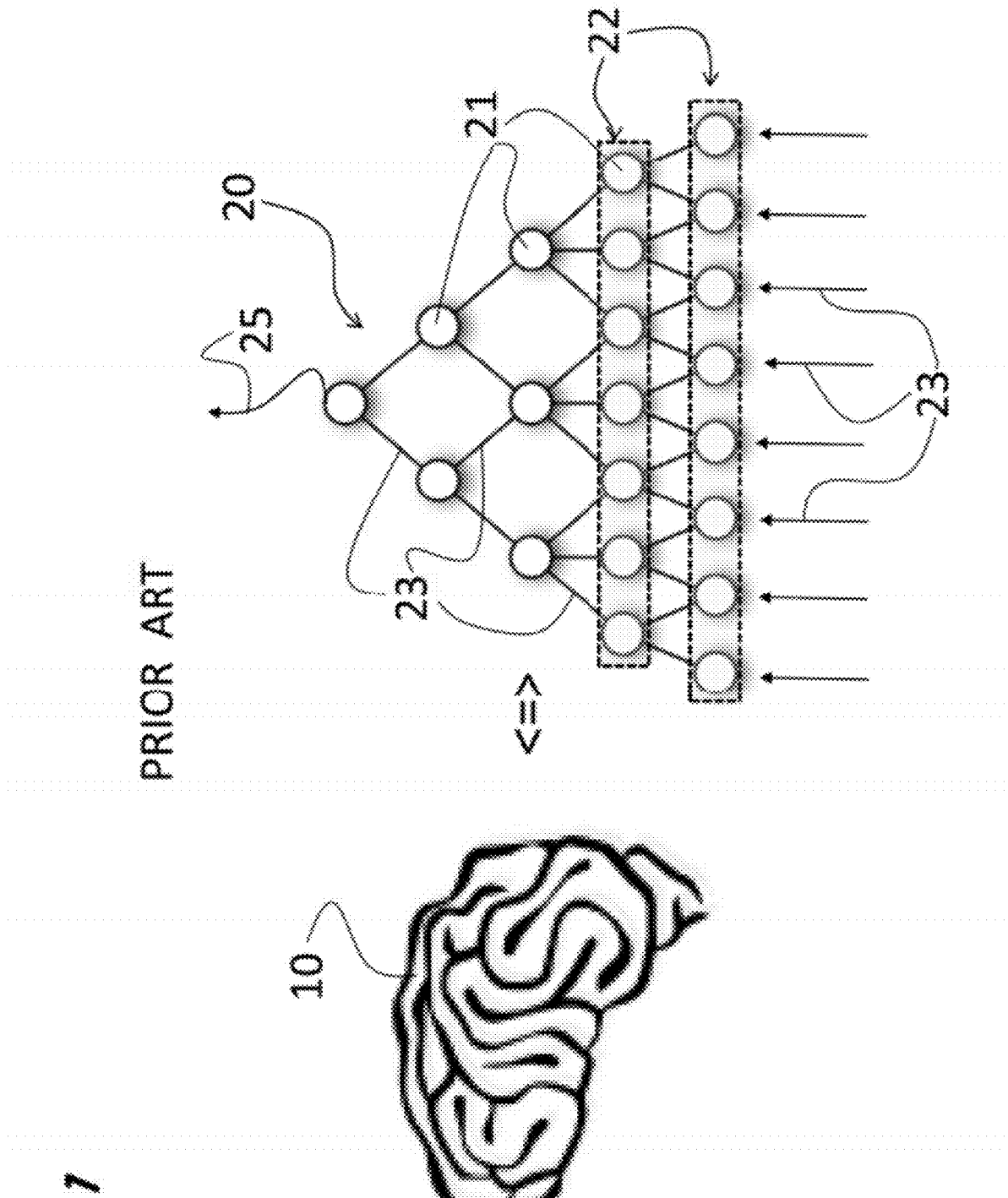
FIG. 1 is an illustration of the prior art.

One example of a conceptual approach to modeling human perception and a neo-cortex part of human brain believed to be responsible for the human perception, classification, and analysis of the real word described in the above-incorporated Arel is presented in FIG. 1. The FIG. 1. illustrated prior art concept of modeling of at least a portion of human neo-cortex 10 using a Hierarchical Temporal Memory (HTM) based pattern Machine depicted in simplified schematic form in FIG. 1. The HTM pattern machine incorporates a network 20 having a plurality of nodes 21 arranged hierarchically in several levels 22. The nodes 21 are connected using variable connections 23 which are generally arranged to communicate information between proximal nodes of nodes 21 of at least two hierarchical levels 22, of which, by necessity of the hierarchical structure, at least one level may be labeled as relatively lower level in relationship to the at least another level labeled as higher level.

The HTM machine network 20 of prior art is arranged at least to receive external information 24 communicated to the nodes 21 of the lowest of the hierarchical levels 22. Variable connections 23 between proximal of the nodes 21 are arranged for bidirectional communication between nodes, and can vary in time and space being modulated using weights ranging from zero to an appropriate maximum value. In addition, the network 20 is arranged to output at least one output value 25 representative to at least one invariant perception distinguishable by a name or a label among a plurality of categories.

Figure 2:
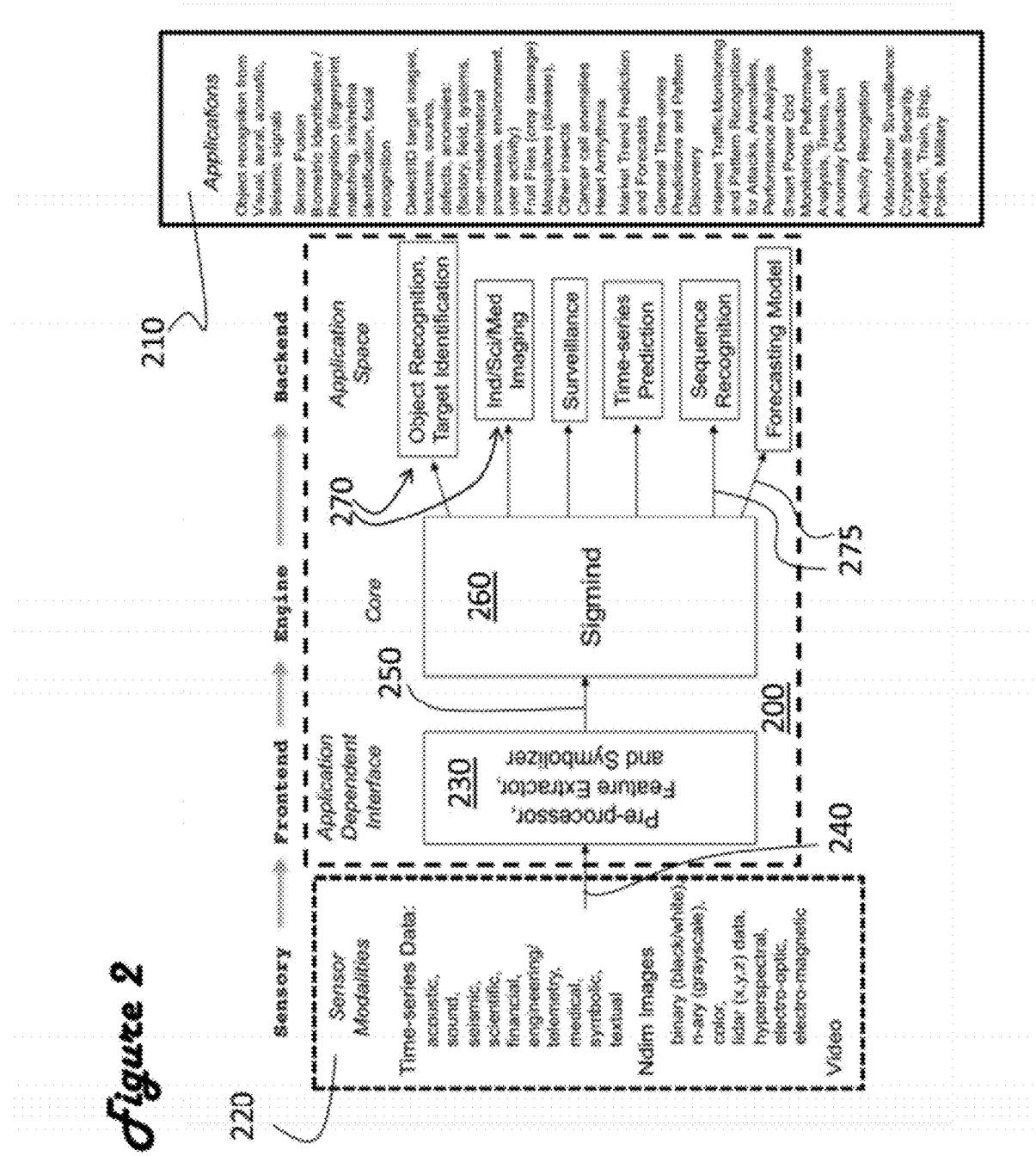
FIG. 2 is a schematic illustration of an exemplary embodiment of the present invention.

One class of possible embodiments of the present invention is illustrated schematically in FIG. 2. The self-organizing computing machine 200 is illustrated in relation with an exemplary (but not complete or even extensive) list of possible applications 210. The Sensor Modalities block 220 indicates different sensors and measurement systems pertinent to the particular segment of the real word of interest for particular observation and/or measure activities. The Sensor Modalities block 220 enlists exemplary categories of time-series data, multidimensional (Ndim) images and (generalized) video data which may include not only streaming optical images but also pertains to other streaming multi-sensor information. It should be noted that an average practitioner may directly deduce that numerous combinations of the enlisted categories and other related items should be included among the Sensor Modalities 220. It is understood that pluralities of known sensors and measurements methods are not included in the self-organizing computing machine 200 of this class of exemplary embodiments. It should be noted that, in general, sensors, measurement systems, and measurement procedures may be included as parts of self-organizing computing machines 200, for example in chases when sensory apparatus incorporates functions of data pre-processing, data analysis and classification, or feature extraction and symbolizing, as pre-processors and (particularly) feature extractor 230 are considered to be intrinsic parts and functions of the self-organizing computing machines 200 (as illustrated in FIG. 2).

It should be emphasized that pre-processing and feature extraction activities closely depend on particular embodiments applications. It may include standard methods and processes based on known algorithms or specialized methods purposely developed and closely related to inventions and novel methods of the current application.

In particular, the feature-extracting preprocessor devices are arranged and programmed to receive the at least one predetermined set of provided inputs 240 and to process it to determine at least one hierarchical set of at least two correlants 250 commensurate with the at least two hierarchical levels 22 of the self-organizing computing machine 200 core 260 indicated as "Sigmind" in the embodiment in FIG. 2.

FIG. 2. also indicates under "Application Space" at least one output unit 270 arranged to interface the at least one invariant perception 275 distinguishable by a name, or a label, among the plurality of categories. The output units 275 can be in the form of conventional displays arranged for direct inspection by users or may be in a form of known interface devices arranged for communication electronic or optoelectronic signals.

Figure 3:
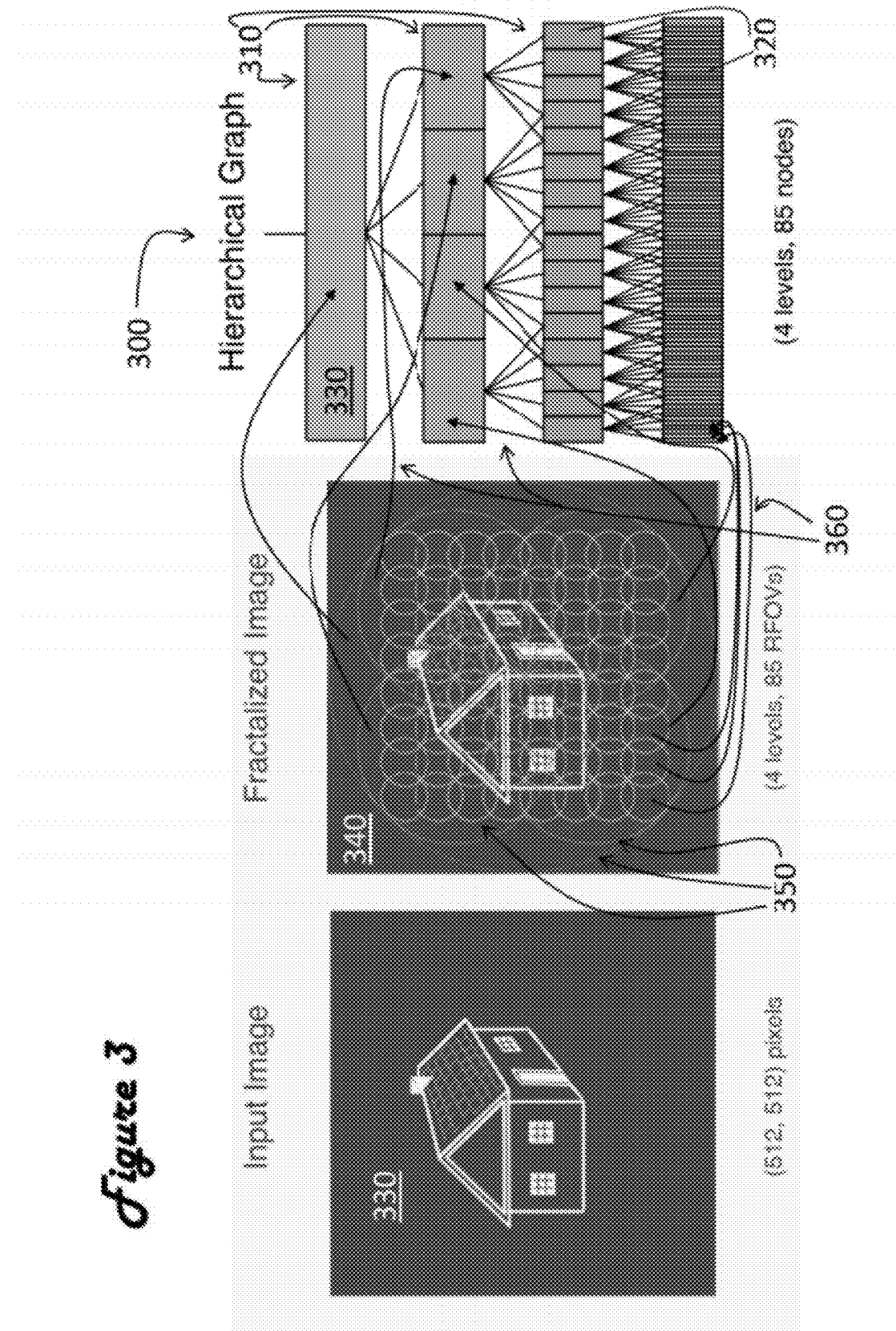
FIG. 3 is another schematic illustration of an exemplary embodiment of the present invention.

One exemplary application of an embodiment of present invention is illustrated schematically in FIG. 3. The self-organizing computing machine 200 symbolized incorporates a hierarchical network 300 (symbolized by the "Hierarchical Graph") including four hierarchical levels 310 having 85 ($1+4+4^2+4^3$) nodes 320. The self-organizing computing machine 200 is arranged and programmed to classify patterns provided as input images 330 having, for example, 512×512 pixels resolution. The input image 330 is fractalized by a feature extractor 230 (not shown in FIG. 3.) using a hierarchy of circular areas 350 chosen such that the diameter of the smallest area is substantially smaller than a characteristic scale length of the pattern of interest, while the largest diameter area substantially includes the entire pattern of interest.

The feature extractor 230 analysis each area 350 based on contrast between proximal pixels and generates correlants 360 containing an appropriate digital characterization of the relationship between the proximal pixels. The correlants 360 are communicated to appropriate levels 310 of the hierarchical network 300 such that the correlants generated at the smallest scale lengths are arranged to provide inputs to nodes 320 of the lowest hierarchical level 310, while the correlants 360 generated at the largest Scale length are arranged for communication to the node 320 of the highest hierarchical level 310.

FIG. 3 illustrates an image fractalization using predetermined scale lengths. An example of an embodiment utilizing potentially more flexible fractalization is illustrated in FIG. 4a. Here, only predetermined initial areas 410, having different scale lengths sufficient to substantially represent the image 330, area are prescribed to the feature extractor 230. The feature extractor 230 is arranged and programmed to detect a measure the pixel contrast for each initial area 410, and, based on the measured results rearrange the initial areas (and the pre-provided scale lengths) such that new areas 420 have centroids 430 coinciding with the maxima of the pixel contrast measure for each area 420. The centroids 430 can be correlated with certain symmetry features of the objects of interest 450 (FIG. 4c) or be attracted to the discontinuities or relatively complex detail structures (FIG. 4b)

Figure 4:
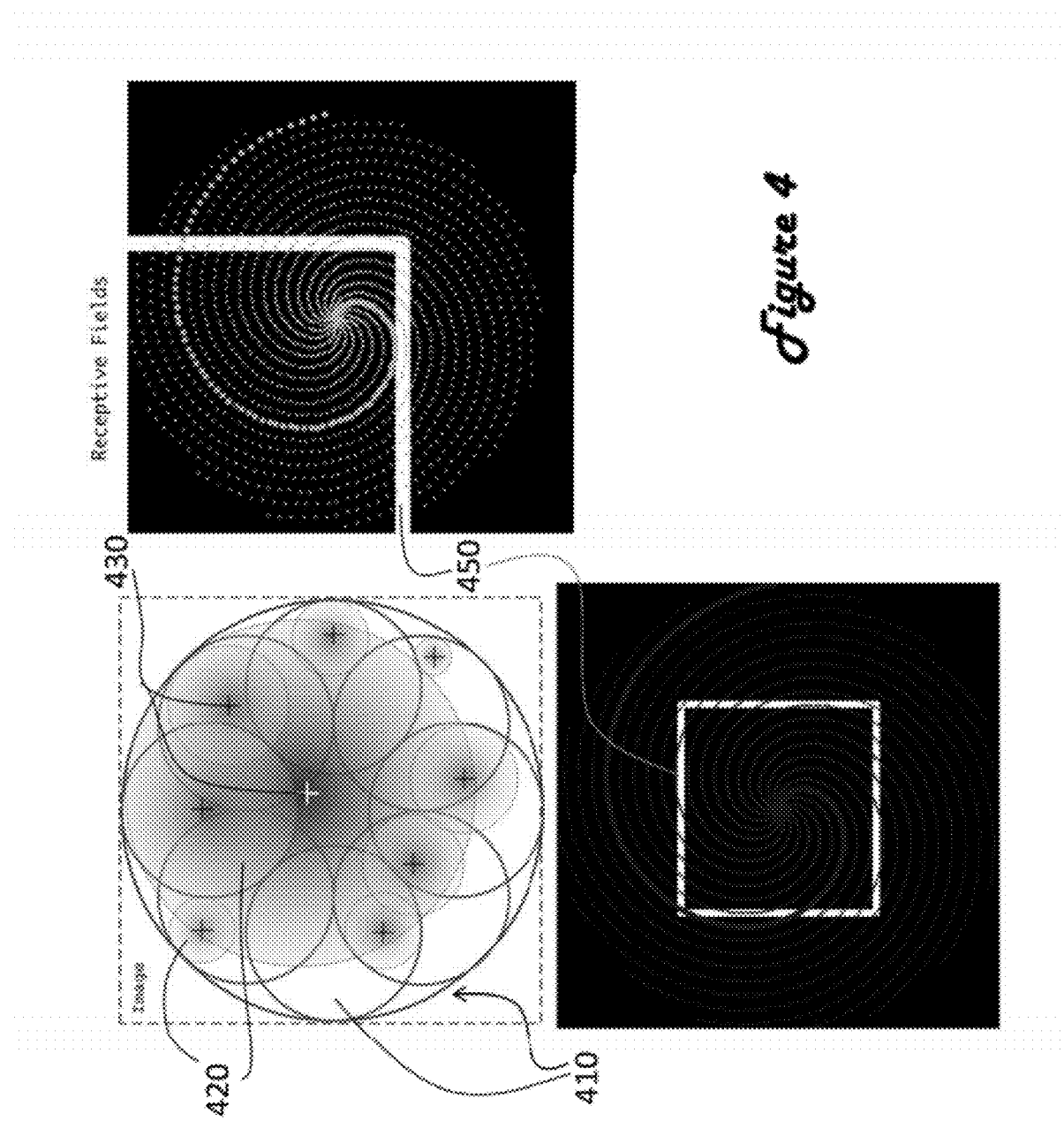
FIG. 4 is an illustration of an exemplary fractalization in accordance with one embodiment of the present invention.

Also, the feature extractor 230 of the exemplary embodiment in FIG. 4 may be arranged to perform a spiral scan of each area 420 such that the pertinent measure of pixel contrast does not depend on the azimuthal orientation of the object of interest 450. In addition, the spiral scan process centered on the local maximum of the pixel contrast measure inherently provides adaptive weighted sampling corresponding to the defining features of the object of interest 450.

Figure 5:
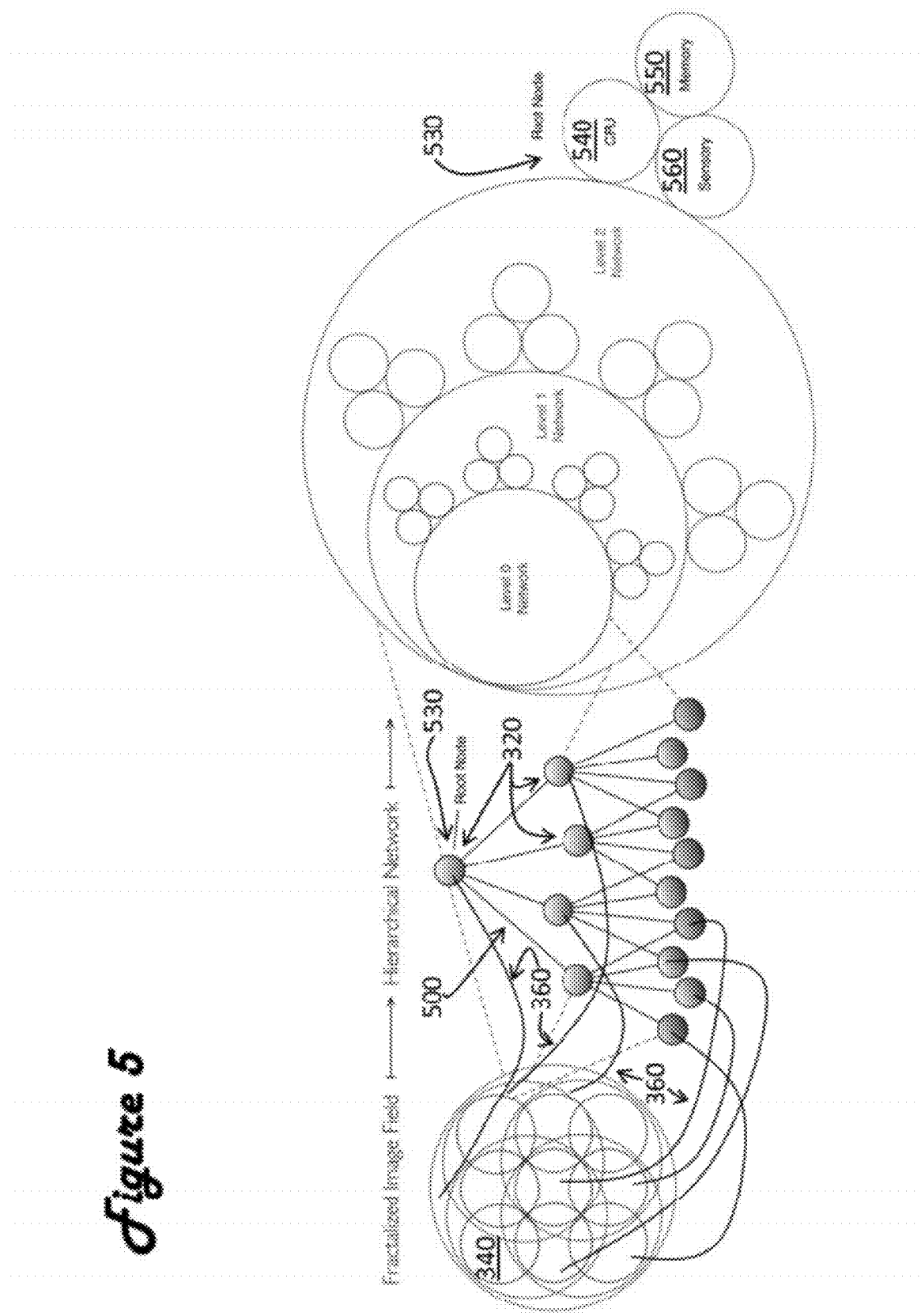
FIG. 5 is another illustration of an exemplary fractalization in accordance one embodiment of the present invention.

One concept unifying disclosed embodiments is illustrated in FIG. 5. The fractalized image 340 has been segmented in 16 lowest level circular areas, four intermediate level circular areas, and one highest level area. The fractalization of the image 340 is correlated to the three-level (levels 0 to 2 in FIG. 5), 20-node hierarchical Local Network 710 which models a three-level, 20-node self-organizing computing machine 510. The three-level, 20-node self-organizing computing machine 510 incorporates substantially similar nodes 320 arranged to process a plurality of hidden and observed random variables using algorithm that is also fractal-like. The nodes 320 (including the root node 530) incorporate several functional parts including the Code-Predict-Update (CPU) processor 540, local memory 550, and local correlant sensory input 560 arranged to receive correlants 360 representative of the real world. The nodes 320 are arranged to combine ensemble learning with reinforcement learning at each node in a dual cycle that may repeat indefinitely. The learning algorithm is also self-similar (may be repeated identically at each node but possesses different state information and operates on different data values. The overall computer architecture may be Single Instruction Multiple Data (SIMD) and, therefore, it may be straightforwardly adapted for parallel data processing. So it may be executed very fast in software on parallel vector computers or highly parallel hardware like Field Programmable Gate Arrays (FPGAs).

The aforementioned exemplary embodiments are pertinent to sensor modalities capable to generate sets of inputs indicative of the real word segments exhibiting substantially fractal-like properties of self-similarity of physical or relational structures associated with distinct spatial, temporal, or spectral scales (or its combinations) between at least two different scales. As in examples disclosed above, in applications concerning analysis of 2D images (black/white, grayscale, color, and/or combined) which can be segregated in accordance to length scales ranging from a single pixel (or grain) size, over image segments characteristic lengths, to the integral image scale length, pertinent feature extractors 230 may be arranged to generate correlants commensurate to, for example, edges (lines), corners (angles and/or discontinuities), enclosed areas (fields and object elements), linear and areal associations (objects), and scenes, (objects grouped in accordance with particular geometric relationships or functional interactions), such that resulting correlats preserve inclusive hierarchical nature of the 2D image of interest, and are, therefore, communicated to appropriate nodes 320 of hierarchical levels 310. It may be noted that, at least in part because of self-similarity, information processing and learning functions at each node 320 can be handled using similar hardware and software for each node 320 regardless of its association with particular hierarchical level 310 or position of the particular hierarchical level 310 with respect to the hierarchical structure of the hierarchical network 300.

In contrast, in many cases of different embodiments lacking the above fractal property of self-similarity even for some of the scales, it may be inhibitive to artificially enforce self-similarity on the pertinent hierarchical networks 20. Even more disadvantageous may be an attempt to force a common learning processes and data processing algorithms on the nodes 320 of the distinct hierarchical levels 310 commensurate with the scales lacking self-similarity. Such examples of applications characterized by a lack of self-similarity between at least some of the characteristic scale levels of the structure of interest will be exemplified and elaborated below.

Figure 6:
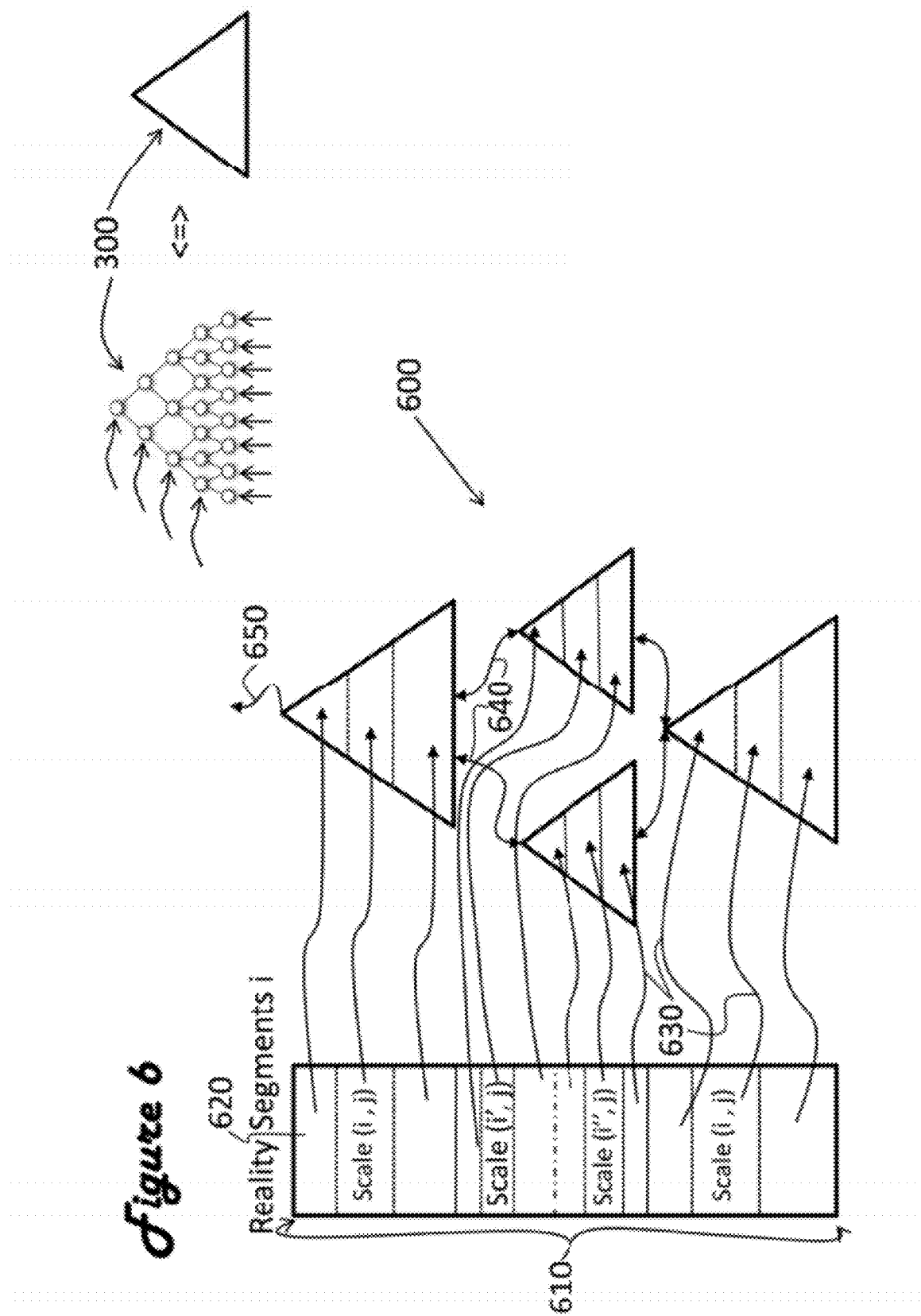
FIG. 6 is an illustration of yet another exemplary embodiment in accordance with the present invention.

One possibility for addressing such applications with devices and methods in the scope of the present invention is illustrated in FIG. 6. The illustrated embodiment may incorporate a composite network 600 integrating several (distinct but connected) networks 300 (symbolized by a simplified symbol Δ). A reality domain of interest 610 can be subdivided in distinct (non self-similar) reality segments 620 enumerated by a running index "i" (having a distinction that the reality segment i' may not be self-similar with the reality segment i"). The reality segments 620 may be naturally further subdivided in accordance with scale parameters generally enumerated by a running indexes "j".

Each self-similar portion of the reality segments 620 may be associated with the appropriate network 300 such that appropriate correlants 630 are communicated to the appropriate hierarchical levels 310 of the particular network 300.

Furthermore, a quantity of processed information 640 (including but not limited to classifications, conclusions, probabilities, timing information, reward parameters etc.) may be communicated up and down between proximal networks 300 to the appropriate hierarchical level 310 of the particular networks 300. Consequently, a high level resulting data 650 (classifications, probability distributions, numerical values, etc.) may be outputted, communicated, and developed in accordance to the composite network learning process.

Several distinguishing features of the FIG. 6 exemplary embodiments may be associated to the disclosed structure. One of it is that each network 300 is enabled to learn on the basis of appropriate self-similar data without requirements for mixing of correlants resulting from physically incongruent or even conflicting scales or segments of reality. In addition, distinct networks 300 may be operated to acquire and process input data using different clocks separately adjusted or optimized for particular circumstances. Finally, it may not be optimal to co-locate networks 300. Having in mind relatively limited character of the processed information 640 communicated between the proximal networks 300, embodiment characterized by an internet-enabled communication structure, or even cloud based embodiments, may be conveniently established and seamlessly exploited.

Figure 7:
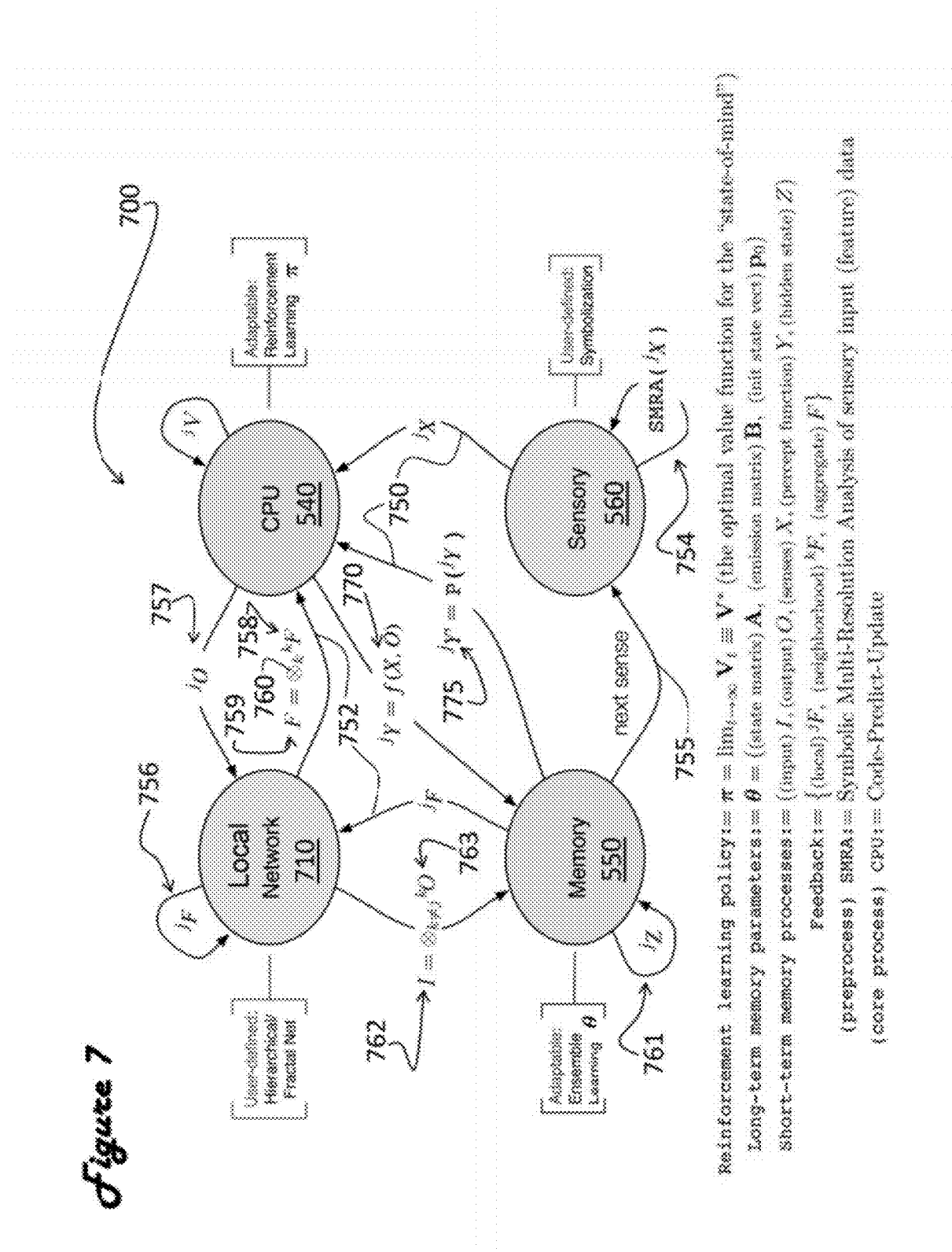
FIG. 7 is a diagram of an exemplary system architecture of one embodiment of the present invention.

FIG. 7 diagrams the Sigmind system Architecture 700. There are four constituent components: Sensory 560, Memory 550, Local Network 710, and CPU 540. The Local Network 710 represents part of the Network 500 arranged to directly communicate with any particular node 320, and, as such, exhibits properties of locality with respects to the particular node 320. Communication between the components is substantially complete, as indicated by the graph arcs 750. The Local Network 710, Memory 550, and CPU 540 are connected with bidirectional data flows 752 (feed-forward and feed-back data: I, O, F); the Sensory communicates data (locally symbolized feature vectors derived from some pre-processing and feature extraction function, SMRA 754) in one direction to the CPU 540; the Memory 550 communicates a control signal (next sense 755) to the Sensory 560 that indicates readiness for the next sensory input. The Local Network 710 also defines the local connections to neighboring (directly connected) nodes 320, which includes self-feed-back (hence the self loop, $^jF$ 756). The CPU 540 feeds output data ($^jO$) 757 to other nodes 320 through the Local Network 710 and receives feedback ($^kF$) 758 from local nodes 320 as well as itself. Separate feedback, $^kF$ 758, incident to a given node 320 j is aggregated into net feedback, F 759, by the operator $\otimes$ 760. The feedback originates at each Memory 550 and is a function of the goodness of predictions conditioned on past experience (short-term memory, $^jZ$ 761, as well as long-term memory encoded in model parameters θ through learning updates) and current context, I 762. In the illustrated embodiment, net input incidents to a node 320 is arranged by aggregating the outputs of neighboring nodes, $^kO$ 763, in a way similar to F 759. For each node 320, j, the current "state of mind" Y is a function of X and O and is computed locally by the CPU 540 and communicated privately to its own storage Memory 550 as $^jY$ 770. Predictions, P, about the next (future) $^jY'$ 775 at the next time step is computed from the memory model, which is conditioned on the current model parameters, θ, and the current input, I. This context, I, is provide as conditioning to each node 320, j, by the neighboring nodes 320 k≠j. Therefore, the context is substantially local to each node 320 and also includes the machine coded sensory input (correlants 360), $^jX$, via the CPU 540 process encodings and updates which may complete the cycle. The exemplary Architecture 700 may induce circuits within the network, which have many intersections and nested, hierarchical structures that may be exploited in the pattern classification.

Each node 320 may incorporate an architecture represented by the exemplary Architecture 700 as illustrated FIG. 7, and may support executions and modifications to a single Algorithm. Each combination of particular Algorithms and Architectures may be classified as a "single set of instruction, multiple data, hierarchically distributed system." That is to say the Algorithm may be identically replicated in each node 320 of the network 300 but each instance executes in a private Memory space, hence data is distributed over the network 300 and is updated as the result of Algorithm execution via bi-directional links 752 data flows.

Figure 8:
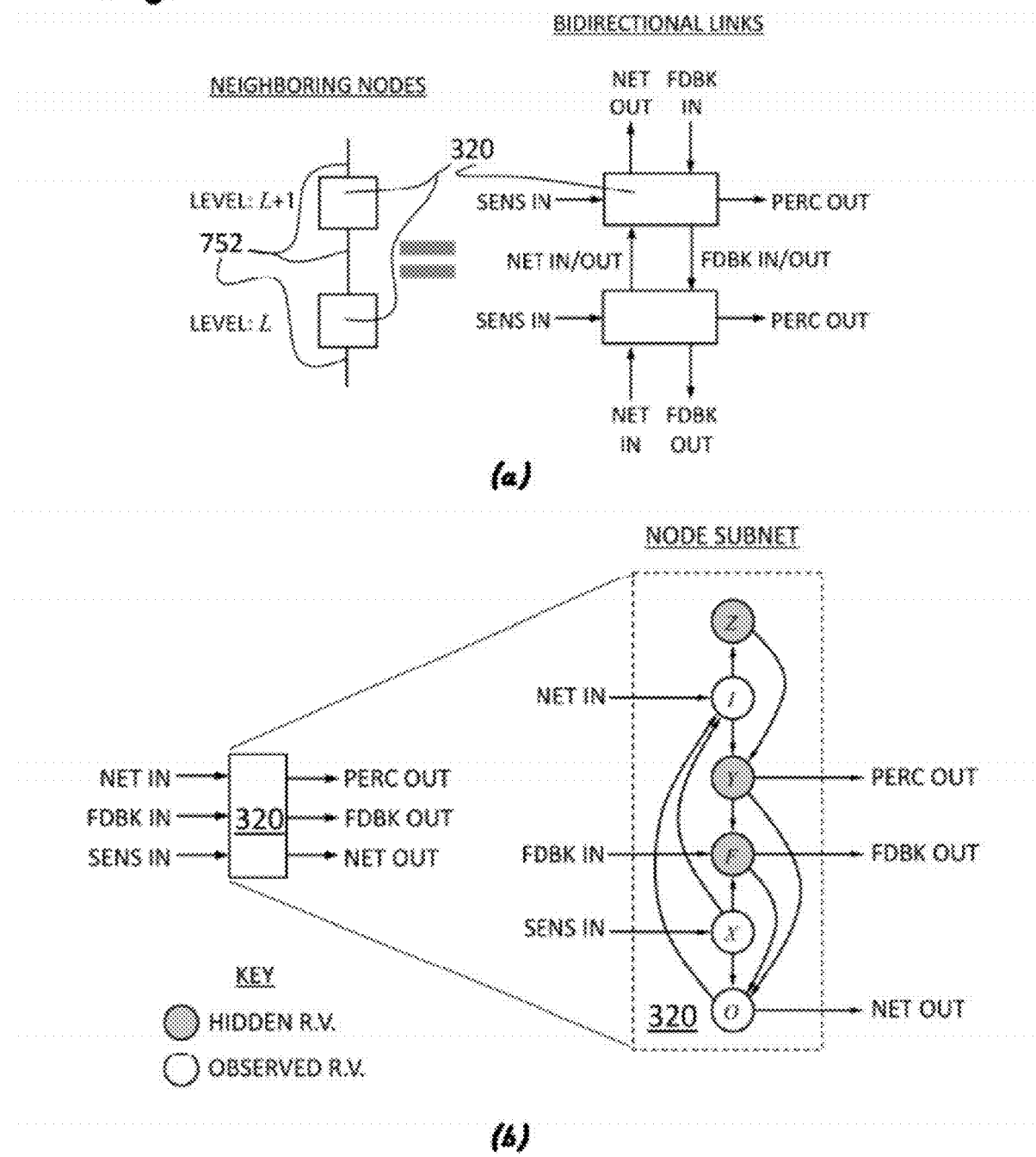
FIG. 8 is a diagram of another exemplary embodiment of the present invention.

The schematic in FIG. 8 ($a$) schematically illustrates an equivalence between network nodes 320 and bi-directional links 752 at two (L and L+1) levels 310 in an exemplary network 300. One goal of each node 320 may be to learn a "policy" for mapping correlants 360 (SENS IN) to percepts (PERC OUT). To that end, each node 320 may be modularized to incorporate a sub-system of sub-nodes in a Bayesian sub-network as shown schematically in FIG. 8 ($b$). Random variables I, O, and X are observed (OBSERVED R.V.) and Z, Y, and F are hidden random variables (HIDDEN R.V.) to be inferred by the probability model parameterized by θ. One embodiment of the invention may utilize an Input Output Hidden Markov Model (IOHMM) with variational parameters θ that are probability distributions of probabilities (measures on measures). Another embodiment may use a sequential Bayesian filter (also known as a particle filter) that uses sequential Markov chain Monte Carlo to sample probabilities. Yet another set of embodiments may apply a Kalman filter, or various combinations of Kalman filters. For instance, one embodiment of the invention may be build on an IOHMM for the probability model P(Z, Y|I, θ) and, simultaneously, on a Kalman filter for the probability model P(F|X, Y, $\ominus$) with model parameters $\ominus$. The model parameters (θ, $\ominus$) are learned from exemplary data observed (X, I, O).

Further referring to FIG. 8 ($b$), each modular node 320 has three inputs and three outputs. The random variable X defines a correlant 360 from SENS IN. The random variable O defines the percept as PERC OUT. In each Local Network 710 of proximal nodes 320, outputs O are aggregated into NET IN, which defines random variable I. Random variable F defines the feedback, Which comes into a given node through FDBK IN from neighboring nodes and, after updating with the advance of time, goes back out to the same neighboring nodes through FDBK OUT. All of the aforementioned random variables are random vectors since the corresponding data is, in general, multidimensional. A given mapping of correlants to percepts is defined by a random variable Y, which is a function of X and O as well as a time index, t, and the underlying probability space of outcomes, Ω, on which the underlying stochastic process is defined. A function, f, having the abbreviated f(X,0) such that the dependence on t and Ω is implicitly understood may be defined. The current instance of random variable Y:=f(X,0) at every node collectively gives the "state of mind" that notionally gives the supporting basis, as well as the equally important biases, on which predictions are made about future values of Y. A policy for mapping X to O at each node 320 may be denoted by the function π: X→O. The random variable Y is a realization of π at any given time instance and PY is the prediction (probability distribution) of its next value when time advances. Thus, random variable Y takes values from the state space of the random function π. And it is this state space of policies that form the conceptual hypothesis space within which Sigmind abstractly "thinks" about cause and effect. "Cause" is the source (object, image, signal, phenomena) causing the feature patterns in the Sensory and Network stimuli as perceived by each node. "Effect" is behavior of the whole system (Memory, Sensory, CPU, and Network) to the stochastic stimuli. The result of the pattern classification is the emission of O, which decides the causes from effects perceived at each node. The collective gives rise to emergent behavior that causes nodes 320 at increasingly higher levels 310 in the hierarchy 300 to converge and stabilize the respective output emissions. The root, node 330 decides the cause of the collective patterns and, thus, the solution to the pattern classification problem. For this to happen, substantially all network nodes 320 converge to stable states of mind, Y, and percepts, O, given current sensory correlant input, X. Fixed-point convergence of all nodes to asymptotical optimum policies ($\pi$), state value functions ($\lim V_t, t \to \infty$), and model parameters ($\theta$, $\ominus$), respectively, may occur with high probability. This substantially result froth the novel combination of ensemble learning and reinforcement learning implemented in the embodiments of the current invention utilizing an exemplary Algorithm 900 diagramed in FIG. 9 and elaborated as follows.

Figure 9:
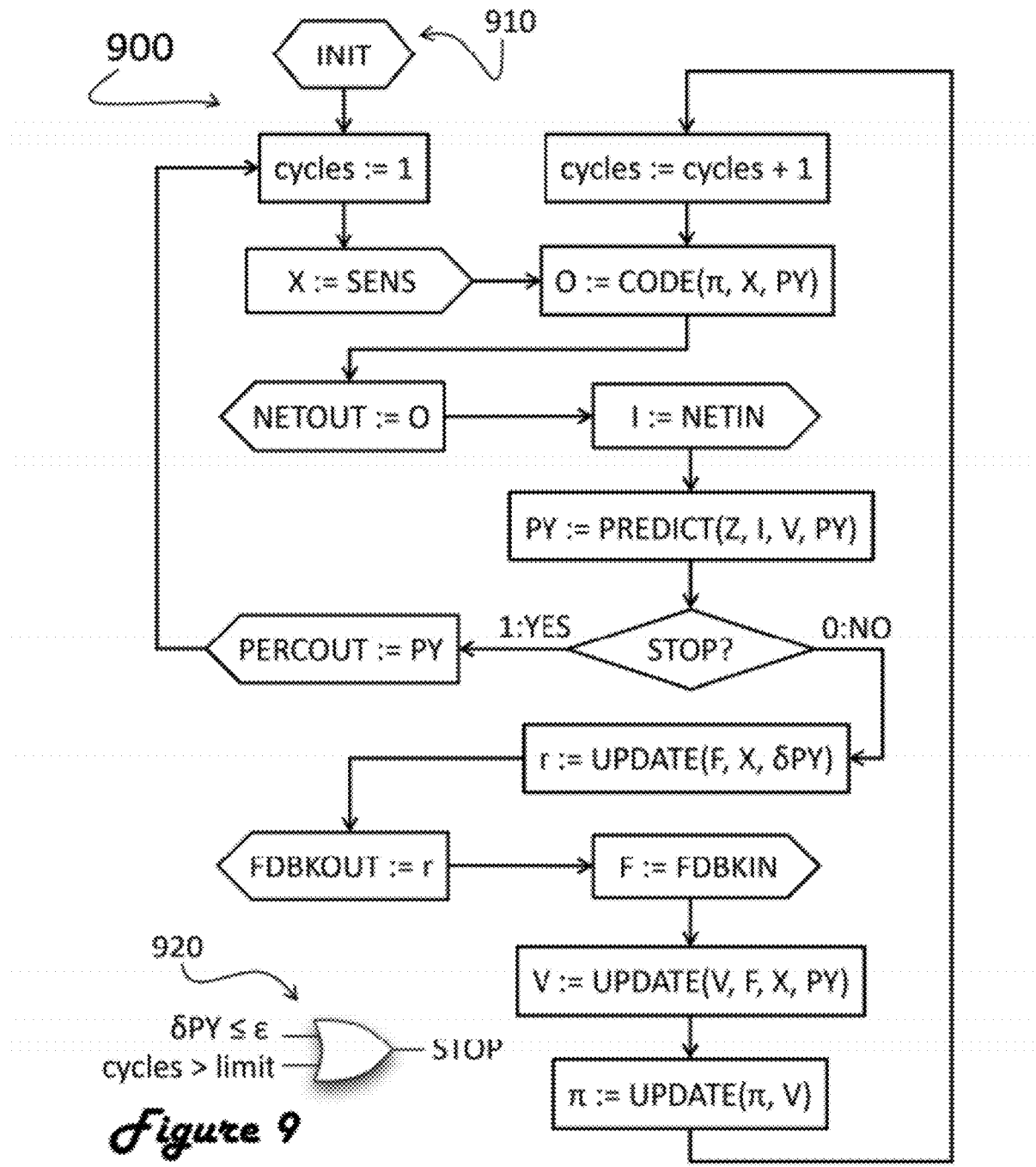
FIG. 9 is a diagram of yet another exemplary embodiment of the present invention.

One exemplary embodiment of Sigmind algorithm is based on the CPU process is illustrated in FIG. 9. The exemplary Algorithm 900 is arranged to perform, both, learning and inference concurrently. Code, Predict, and Update functions form the CPU components that represent significant execution steps in the Algorithm 900.

In addition, further referring to FIG. 9, the Algorithm 190 may start with initialization (INIT) 910 of model parameters ($\theta$) and prior probabilities (PY). The Algorithm 900 proceeds in a cyclical fashion as the Code, Predict, and Update (CPU) steps are iterated. Iteration cycles are counted and used as a convergence criterion 920. In the first cycle, the symbolic sensory data (SENS) is input as X. A percept value is coded as O:=CODE($\pi$, X, PY), which becomes the output emission through NETOUT. Substantially every node 320 is arranged to execute a particular version of the above steps. Afterwards, input is taken from NETIN, which becomes the random variable, I. Nodes 320 use local Memory modeled by the probabilistic sequence of hidden random variables, Z, in time and conditional on input, I, at each time instant as well as state value, V, and current prior, PY, to compute the posterior for PY, which finally becomes the prior in the next iteration. This step may be performed by the function PREDICT. In different embodiments, iteration of the PREDICT function is possible (in the sense of being mathematically correct) when the conjugate property between prior and posterior holds given an appropriate likelihood function that serves as the measurement or observation model. This may be the case, for example, with an exponential family of probability models: Gaussian processes for real-valued variables; Dirichlet processes for discrete-valued variables. In such cases, the posterior probability distribution will have the same form as the prior distribution after multiplication by the likelihood function. Thus, the posterior can be reused as the prior in the next iteration. Indeed, this may be used as a particular feature of the PREDICT function. The Algorithm 900 then checks the convergence criteria 920 such as the number of cycles reaching a limit or the change in PY becoming sufficiently small ($\epsilon$). If convergence is achieved, then PY is emitted as the output percept (PERCOUT) and the Algorithm 900 repeats from the beginning with the next sensory input (SENS). Otherwise (if convergence is not yet achieved) then feedback, r, a "reward" function, computed by UPDATE as a function of the prediction, PY, current sensory input, X, and feedback, F. The FDBKOUT provides reward r to neighboring nodes and aggregated in each as an updated feedback, F. This updated feedback variable (F) is in turn used to UPDATE the state value, V, which is used in a reinforcement learning to UPDATE the policy, $\pi$. And this completes the cycle. Subsequent cycles are repeated by exploiting the updated policy to CODE for another percept, O. The Algorithm repeats these steps until convergence is reached. After convergence, the Algorithm always repeats itself from the starting point (just after INIT) by considering the next sensory input, X:=SENS. The Algorithm executes in this way ad infinitum.

The Algorithm 900 seeks, as an objective, an optimal setting of policies and parameters ($\pi$, $\theta$, $\ominus$) for every node. This is what is learned. And, as mentioned above, this learning is conducted by a novel and innovative combination of ensemble learning and reinforcement learning. The objective function for these iterative methods of this embodiment is defined by the reward function defining the feedback F at each node. Also, one can define the reward function to be such that the machine's ability to predict future behavior is measured and its value maximized. Thus, F may be defined to be large (and positive) when PY improves, and small (even negative) when PY worsens.

Figure 10:
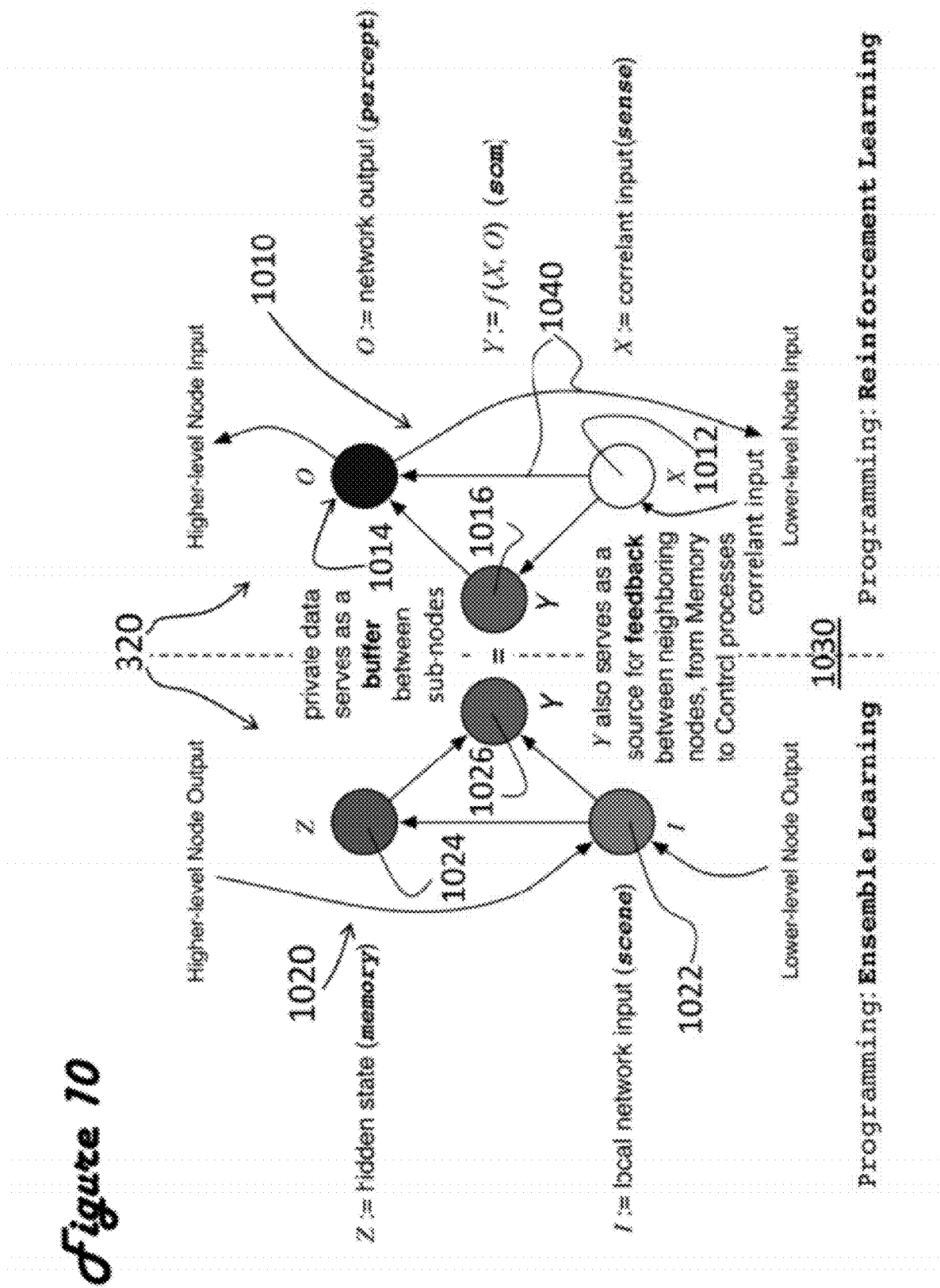
FIG. 10 is a diagram of yet another exemplary embodiment of the present invention.

As disclosed above and illustrated in FIG. 9, each node 320 of the hierarchical network 300 incorporates at least one reinforcement learning sub-network, and at least one ensemble learning sub-network. In FIG. 10, the reinforcement learning sub-network 1010 and the ensemble learning sub-network 1020 are conceptually separated by a boundary 1030. The reinforcement learning sub-network 1010 at least incorporates a correlant input sub-node 1012 (also indicated by "X", following a convenient convention of indicating the sub-nodes by the name of random variables predominantly stored in the particular sub-node) arranged to receive correlants of the appropriate level, an output sub-node 1014 (also indicated by "O") arranged to output information to proximal nodes 320, and a state-of-mind sub-node 1016 (also indicated by "Y") arranged to be, among other, a buffer between the reinforcement learning sub-network 1010 and the ensemble learning sub-network 1020. In addition, the state-of-mind sub-node 1016 (as well as the corresponding state-of-mind sub-node 1026) may be arranged for information exchange with proximal nodes 320 either via direct connection to the corresponding state of the mind sub-nodes 1016 and 1026 or other sub-nodes arranged for information exchange.

The ensemble learning sub-network 1020 of the FIG. 9 illustrated exemplary embodiment at least incorporates a local input sub-node 1022 (also indicated by "I") arranged to receive information from proximal nodes 320 of the same or proximal hierarchical levels 310, a hidden state sub-node 1024 (also indicated by "Z") arranged to integrate and store previously determined information, and another state-of-mind sub-node 1026 (also indicated by "Y") also arranged to be, among other, a buffer between the reinforcement learning sub-network 1010 and the ensemble learning sub-network 1020, in addition to being arranged for aforementioned information exchange, with proximal nodes 320.

Regarding, in particular, the node 320 of the exemplary embodiment illustrated in FIG. 10 (and, in general, other embodiments schematically represented in previous and subsequent Figures) it may be noted that a plurality of information exchange connections 1040 include directionality indicators ("arrow-heads") indicating only a predominant direction of information flow during the node 320 utilization. It should be emphasized that information exchange connections 1040 are arranged for bidirectional communication between nodes 320 and/or sub nodes 1012-1026. Consequently, practitioners may deduce that information processed in the node 320 may be iterated repeatedly by cycling (during a predetermined time period, for determined number of cycles, or to achieve a desired measure of convergence), for example between sub-nodes 1012, 1016 (1026), and 1014 before outputting the determined values to proximal nodes 320.

Figure 11:
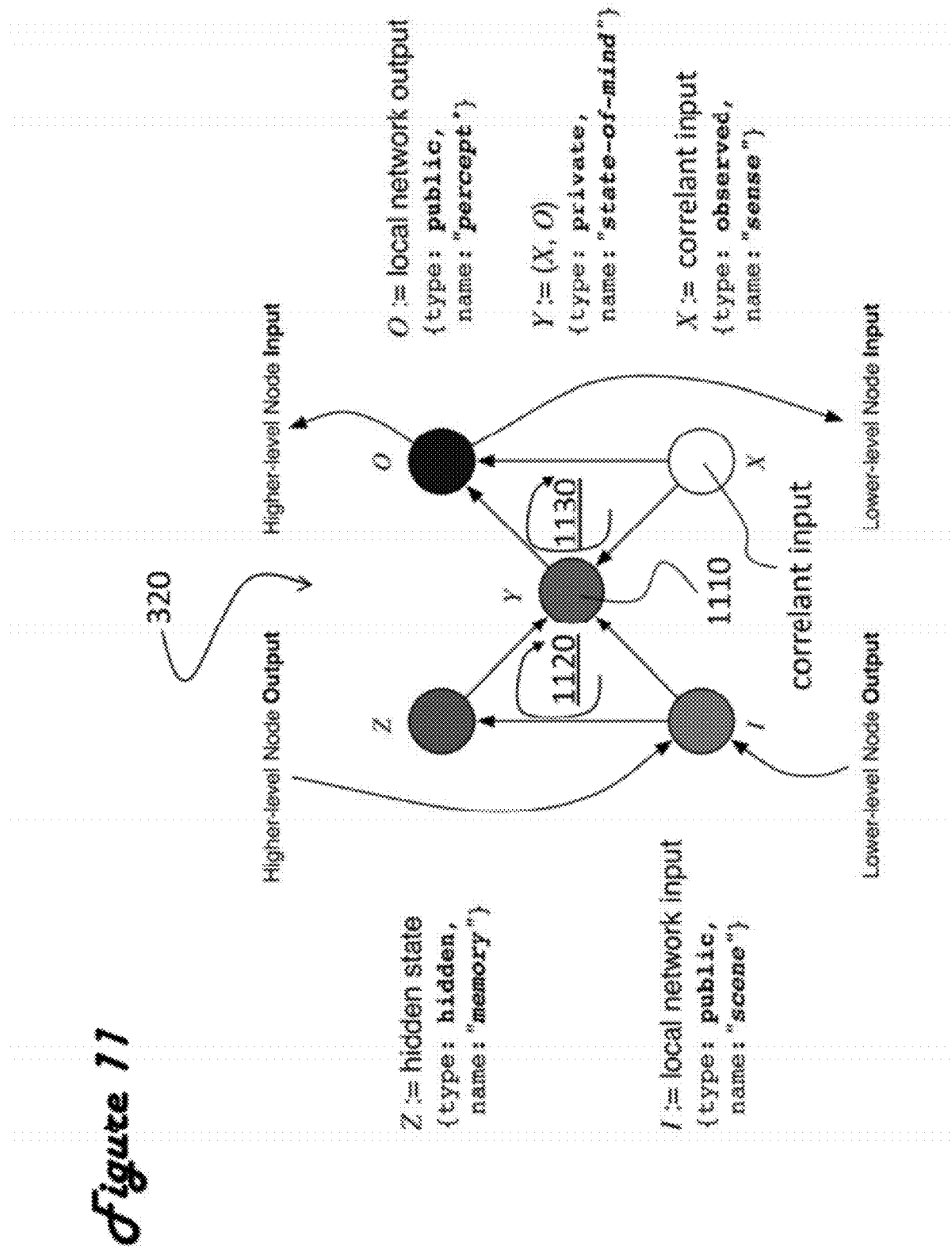
FIG. 11 is a diagram of yet another exemplary embodiment of the present invention.

FIG. 11 illustrates schematically a node 320 in accordance to another exemplary embodiment. From the above disclosure, one may conceptualize a node 320 exhibiting a common state-of-mind sub-node 1110 naturally integrating at least one reinforcement learning sub-network 1010, and at least one ensemble learning sub-network 1020 of FIG. 10. In the current embodiment relative adaptivity and efficiency exhibited by a reinforcement learning algorithm may be closely coupled and reinforced by relative stability exhibited by an ensemble learning algorithm both integrated to generate the state of the mind contents according to processed correlants and a dynamic set of criteria used for evaluation of the predictive abilities of each node 320 in the hierarchical network 300.

It may be noted that in the node 320 of the FIG. 11 illustrated embodiment two connected iterations loops of interest may be performed. An ensemble learning iteration loop 1120 may substantially integrate previous information as maintained in the hidden state Z modulated by proximal levels input I to generate the state-of-mind values, which may be in turn iteratively evaluated against appropriate correlants X and outputs to the proximal nodes O. Also, as disclosed above, in different embodiments state-of-mind values Y may be communicated directly to the proximal nodes either via corresponding state-of-mind sub-nodes Y or other appropriate sub-nodes like I, O, or X. Similarly, it may be further noted that in the node 320 of the FIG. 11 illustrated embodiment a reinforcement learning iteration loop 1130 may substantially integrate correlant input as maintained in the sub-node X modulated by the state-of-mind random variable values Y to generate the local network outputs O to the proximal nodes 320.

Further considering exemplary embodiment having the node 320 illustrated in FIG. 11, FIG. 12 schematically illustrates an exemplary network 300 of such nodes 320 with an emphasis on a plurality of information exchange connections 1240 connecting state-of-mind sub-nodes 1110 with other proximal sub-nodes. Among other things, an operator familiar with operations of self-organizing computing machines may note that direct data exchange especially involving state-of-mind sub-node may considerably facilitate at least the reinforcement learning functions of the network 300.

FIG. 13 schematically illustrates additional features of the ensemble learning process of the aforementioned embodiment of individual single nodes 320 (FIG. 11) pertinent to time dependency of the hidden state sub-node accumulated values generally in accordance to the statistical model known as Input Output Hidden Markov Model. The illustrated ensemble learning scheme represent a specialized exemplary application of a class of variational Bayesian extension of Expectation-Maximization (EM) algorithms, well known to practitioners of contemporary statistics. By the algorithm of current invention ensemble learning is accomplished essentially by propagating contents of the hidden state sub-node Z through subsequent time steps (e.g. at the times t−1, t, t+1 . . . ) while combining it with values stored in the state-of-mind sub-node Y and values received by the local input sub-node I from proximal nodes 320. It may be noted that running of such an algorithm contents of the hidden state sub-nodes of each node 320 accumulate information received in previous time steps modified by responses of proximal nodes 320 and/or the contents of the state-of-mind sub-mode. It may be also noted that, as discussed above, several exchanges of contents between I, Y, and Z sub-nodes may be arranged in several "loops" performed between time steps (e.g. between the times t−1 and t or t and t+1) which may yield a modicum of convergence or some measure of stabilization of at least values stored in Z and Y sub-nodes.

In analogy with FIG. 13, FIG. 14 schematically illustrates additional features of the reinforcement learning process of the aforementioned embodiment of individual nodes 320 (FIG. 11) pertinent to time dependency of state-of-mind perceptions in accordance with a reinforcement learning strategy. As discussed above, at each time step (e.g. at the times t−1, t, t+1 . . . ) appropriate correlants 360 are provided to the correlant input sub-nodes X. Those correlants are combined with the contemporary state-of-mind values and feedbacks 130, also indicated as time-dependent $F_t$ values (e.g. $F_{t-1}$, $F_t$, $F_{t+1}$, etc.) It may be noted that the values of the percept output ($O_t$) sub-nodes are conditioned by both the feedback 1300 ($F_t$) and correlant 360 ($X_t$) values which facilitate by rewarding congruencies of predictions/perceptions. As above, one may note that in different embodiments various schemes of iterative stabilization (if not a full convergence) of the state of the mind values and/or outputted perceptions may be incorporated in the reinforcement learning process.

It is also may be useful to reiterate that the above division between the ensemble learning process and the reinforcement learning process are done on conceptual basis and used for more transparent disclosure of the learning algorithm. In the disclosed embodiments of current invention the above learning schemes are substantially interdependent (at least through the closely connected or common state-of-mind sub-nodes and associated values Y).

In one embodiment of the self-organizing computing process for mapping from the patterns contained within set of inputs to perception distinguishable by a name or a label is computer coded using program modules written in Python, well known interpreted, object-oriented, high level programming language with dynamic semantics. As written, Python modules may be flexibly combined and executed on variety of computers ranging in scale from portable units to integrated parallel computing devices. One additional features of modular Python encoding relates to ability to naturally adjust scales and structures of networks 300 to the particular problems. Therefore, networks with variable number of nodes 320, levels 310, or different information exchange connections 1040 structures can be established without needs to modify actual code governing nodes 320 algorithms. Thus, corresponding preprocessing (e.g. fractalization scheme as illustrated in FIGS. 3 and 4) may be conveniently optimized to correspond to the particular classification problem.

In one example, a 2D image analysis for shape classification is performed generally following the machine and the process as disclosed in as illustrated in FIGS. 3-5 ad described in the above disclosure. In one example performed on a portable personal computer, a 2D rendering of capital character "A" was successfully "recognized" (i.e. classified in a common class of shapes regardless of size in pixel, orientation, or details distinguishing several of used fonts) among several renderings of linear figures including a square, a rectangle, a five-point star, and a set of waive lines. This classification is repeatedly achieved using just a 7-node network (e.g. in 1-2-4 configuration) initiated by presentation of only one rendering of the character "A" rotated sequentially through several orientations.

In another example, above elaborated network 300 including four hierarchical levels 310 having 85 ($1+4+4^2+4^3$) nodes 320, as illustrated in FIG. 3, is dynamically trained to "recognize" shapes of a house from isometric linear renderings and low-resolution (e.g. 512×512) photos of scaled, rotated, and/or distorted houses, dogs, and bicycles (in linear rendering and in gray-scale photos). This embodiment was reduced to practice on a desk-top work station programmed to perform one cycle of classification/learning sequence in several minutes of running time. It may be noted that, because of dynamic features pertinent disclosed combination of ensemble and reinforcement learning algorithms, the machine and the process of the current embodiment self-develop during the classification making the choice of the classification process end point conditional on the actual task and external predetermined measures of sufficient or desired success.

The present invention has been described with references to the above exemplary embodiments. While specific values, relationships, materials and steps have been set forth for purpose of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

I claim:

1. A self-organizing computing machine for mapping from a plurality of patterns contained within at least one predetermined set of provided inputs to at least one invariant perception distinguishable by a name or a label among a plurality of categories, wherein the self-organizing computing machine comprises:
    at least one network of at least three nodes interconnected by variable connections into at least two hierarchical node levels including at least a lower node level and a higher node level;
    at least one feature extractor arranged to receive the at least one predetermined set of provided inputs, to process the at least one predetermined set of provided inputs to determine at least one hierarchical set of at least two correlants commensurate with at least two hierarchical correlant levels including at least a lower correlant level and a higher correlant level, and to communicate the determined hierarchical sets of at least two correlants to the at least two distinct nodes of the at least two distinct hierarchical node levels commensurate with the at least two correlants of the at least two distinct correlant levels such that the correlants of the lower correlant level communicate to the corresponding nodes of the lower node level and that the correlants of the higher correlant level communicates to the corresponding nodes of the higher node level; and
    at least one output unit arranged to interface the at least one invariant perception distinguishable by a name, or a label, among the plurality of categories;
    wherein, the at least one node at each hierarchical node level incorporate at least one reinforcement learning sub-network combined with at least one ensemble learning sub-network;
    wherein, the at least one reinforcement learning sub-network has been arranged to receive the commensurate correlants of the hierarchical sets of at least two correlants, to determine a plurality of output values and to output the output values from the determined plurality of output values to the nodes of the higher node level and the nodes of the lower node level; and
    wherein, the at least one ensemble learning sub-network has been arranged to receive and to combine at least one output value from the at least one node of the higher node level and to receive and to combine at least one output value from the at least one node of the lower node level.

2. The self-organizing computing machine of claim 1, wherein the at least one reinforcement learning sub-network incorporates a correlant input sub-node, an output sub-node, and a state-of-mind sub-node.

3. The self-organizing computing machine of claim 1, wherein the at least one ensemble learning sub-network incorporates a local input sub-node, a hidden state sub-node, and a state-of-mind sub-node.

4. The self-organizing computing machine of claim 1, wherein the at least one ensemble learning sub-network and the at least one reinforcement learning sub-network incorporate a common state-of-mind sub-node.

5. The self-organizing computing machine of claim 1, wherein the at least one hierarchical node level incorporates at least two proximal nodes arranged for a direct information exchange between the at least two proximal nodes.

6. The self-organizing computing machine of claim 5, wherein the at least two proximal nodes have been arranged for the direct information exchange between the pertinent state-of-mind sub-nodes of the at least two proximal nodes.

7. The self-organizing computing machine of claim 5, wherein the at least two proximal nodes have been arranged for the direct information exchange between the at least one state-of-mind sub-nodes and the at least one local input sub-node of the at least two proximal nodes.

8. The self-organizing computing machine of claim 5, wherein the at least two proximal nodes have been arranged for the direct information exchange between the at least one state-of-mind sub-nodes and the at least one output sub-node of the at least two proximal nodes.

9. The self-organizing computing machine of claim 1, wherein each of the at least two proximal hierarchical node levels incorporates at least one proximal node arranged for direct information exchange with the at least another proximal node incorporated in the different proximal hierarchical node level.

10. The self-organizing computing machine of claim 3, wherein the at least one ensemble learning sub-network incorporates the hidden state sub-node arranged to derive and preserve information based on past information previously contained in the state-of-mind sub-node.

11. The self-organizing computing machine of claim 4, wherein the at least one node at each hierarchical node level comprises the ensemble learning sub-network arranged for an iterative exchange of information between a hidden state sub-node and the common state-of-mind sub-node, and the reinforcement learning sub-network arranged for an iterative exchange of information between an output sub-node and the common state-of-mind sub-node.

12. The self-organizing computing machine of claim 2, wherein the at least one reinforcement learning sub-network incorporates a reward feed-back sub-node arranged to receive process and communicate a reward information arranged to modulate the output value.

13. The self-organizing computing machine of claim 12, wherein the reward feed-back sub-node process and communicate reward information arranged to modulate the reinforcement learning sub-network output as a function of previous output values.

14. A self-organizing computing process for mapping from a plurality of patterns contained within at least one predetermined set of provided inputs to at least one invariant perception distinguishable, by a name or a label, among a plurality of categories, the self-organizing computing process comprises:
  a) providing at least one self-organizing computing machine incorporating at least one network of at least three nodes arranged in at least two hierarchical node levels including at least a lower node level and a higher node level; at least one feature extractor for receiving the at least one predetermined set of provided inputs, processing the at least one predetermined set of provided inputs to determine a hierarchical set of at least two correlants commensurate with the at least two hierarchical correlant levels including at least a lower correlant level and a higher correlant level, and communicating the determined hierarchical sets of at least two correlants to the at least two distinct nodes of the at least two distinct hierarchical node levels commensurate with the at least two correlants of the at least two distinct correlant levels such that the correlants of the lower correlant level communicates to the corresponding nodes of the lower node level and that the correlants of the higher correlant level communicates to the corresponding nodes of the higher node level; at least one output unit for interfacing the at least one output one invariant perception distinguishable, by a name or a label, among categories; wherein, the at least one node at each hierarchical node level includes at least one reinforcement learning sub-network combined with at least one ensemble learning sub-network; wherein, the at least one reinforcement learning sub-network have been arranged to receive the commensurate correlants of the hierarchical sets of at least two correlants, to determine a plurality of output values and to output the output values from the determined plurality of output values to the nodes of the higher node level nodes and the nodes of the lower node level; and wherein, the at least one ensemble learning sub-network has been arranged to receive and to combine at least one output value from the at least one node of the higher node level and to receive and combine at least one output value from the at least one node of the lower node level;
  b) providing at least one predetermined initial set of inputs, to the at least one feature extractor and determining the hierarchical set of at least two correlants commensurate with the at least two hierarchical correlant levels;
  c) communicating the determined hierarchical sets of at least two correlants to the at least two distinct nodes of the at least two distinct hierarchical node levels commensurate with the at least two correlants such that the correlants of the lower correlant level communicate to the corresponding nodes of the lower node level and that the correlants of the higher correlant level communicate to the corresponding nodes of the higher node level;
  d) determining at least one output value from each of the at least two distinct nodes and providing the determined output values from each node to proximal nodes of the at least one network of the at least one self-organizing computing machine;
  e) after a predetermined time period providing at least another subsequent set of inputs, to the at least one feature extractor and determining the hierarchical set of at least two subsequent correlants commensurate with the at least two hierarchical correlant levels;
  f) communicating the determined hierarchical sets of at least two subsequent correlants to the at least two distinct nodes of the at least two distinct hierarchical node levels commensurate with the at least two subsequent correlants such that the correlants of the lower correlant level communicates to the corresponding nodes of the lower node level and that the correlants of the higher correlant level communicates to the corresponding nodes of the higher node level;
  g) determining at least one subsequent output value from each of the at least two distinct nodes and providing the determined subsequent output values from each node to proximal nodes of the at least one network of the at least one self-organizing computing machine;
  h) determining, based on the at least one subsequent output value of the at least one updated invariant perception distinguishable, by a name or a label, among categories;
  i) repeating sequentially steps c)-h) for another predetermined time period, or for a duration of time necessary to achieve a predetermined convergence of the at least one subsequent output value of a preselected node of the at least one network;
  j) interfacing the at least one updated invariant perception distinguishable, by a name or a label, among categories.

15. The self-organizing computing process of claim 14, wherein providing the at least one self-organizing computing machine includes providing the at least one reinforcement learning sub-network incorporating a correlant input sub-node, an output sub-node, and a state-of-mind sub-node.

16. The self-organizing computing process of claim 14, wherein providing the at least one self-organizing computing machine includes providing the at least one ensemble learning sub-network incorporates a local input sub-node, a hidden state sub-node, and a state-of-mind sub-node.

17. The self-organizing computing process of claim 14, wherein providing the at least one self-organizing computing machine includes providing the at least one ensemble learning sub-network and the at least one reinforcement learning sub-network incorporate a common state-of-mind sub-node.

18. The self-organizing computing process of claim 14, wherein providing the at least one self-organizing computing machine includes providing the at least one hierarchical node level incorporates at least two proximal nodes arranged for a direct information exchange between the at least two proximal nodes.

19. The self-organizing computing process of claim 18, wherein providing the at least one self-organizing computing machine includes providing the at least two proximal nodes arranged for the direct information exchange between the pertinent state-of-mind sub-nodes of the at least two proximal nodes.

20. The self-organizing computing process of claim 18, wherein providing the at least one self-organizing computing machine includes providing the at least two proximal nodes arranged for the direct information exchange between the at least one state-of-mind sub-nodes and the at least one local input sub-node of the at least two proximal nodes.

21. The self-organizing computing process of claim 18, wherein providing the at least one self-organizing computing machine includes providing the at least two proximal nodes arranged for the direct information exchange between the at least one state-of-mind sub-nodes and the at least one output sub-node of the at least two proximal nodes.

22. The self organizing computing process of claim 17, wherein each of the at least two proximal hierarchical node levels incorporates at least one proximal node arranged for direct information exchange with the at least another proximal node incorporated in the different proximal hierarchical node level.

23. The self-organizing computing process of claim 17, wherein the at least one ensemble learning sub-network incorporates the hidden state sub-node arranged to derive and preserve information based on past information previously contained in the state-of-mind sub-node.

24. The self-organizing computing process of claim 17, wherein the at least one node at each hierarchical node level comprises the ensemble learning sub-network arranged for an iterative exchange of information between the hidden state sub-node and the state-of-mind sub-node, and the reinforcement learning sub-network arranged for an iterative exchange of information between the output sub-node and the state-of-mind sub-node.

25. The self-organizing computing process of claim 14, wherein providing at least one predetermined initial set of inputs to the at least one feature extractor and determining the hierarchical set of at least two correlants commensurate with the at least two hierarchical node levels includes decomposing the at least one predetermined initial set of inputs into at least two substantially self-similar hierarchical structures and determining at least one correlant for each self-similar hierarchical structure.

26. The self-organizing computing process of claim 25, wherein communicating the determined hierarchical sets of at least two correlants to the at least two distinct nodes of the at least two distinct hierarchical node levels includes inputting the at least one determined correlant into the at least one reinforcement learning sub-network of the at least one node of the higher node level of the at least one network.

27. The self-organizing computing process of claim 14, wherein determining the updated output value from each of the at least two distinct nodes and providing the determined output values from each node to proximal nodes of the at least one network of the at least one self-organizing computing machine includes determining a value of at least one reward parameter and providing the determined value at least one reward parameter to proximal nodes of the at least one network of the at least one self-organizing computing machine.

28. The self-organizing computing process of claim 14, wherein repeating sequentially steps c)-e) for another predetermined time period or for a duration of time necessary to achieve a predetermined convergence of the output value of a preselected node of the at least one network includes sequential assembling in at least one hidden state sub-node of sequentially updated sets of statistical data corresponding with an evolution of information in the at least one hidden state sub-node of at least one node and utilizing the set of statistical data in combination with the determined output values from each node to proximal nodes to determine an updated value stored in the state-of-mind sub-node of the at least one node of the at least one network of the at least one self-organizing computing machine.

29. The self-organizing computing process of claim 14, wherein the determined output values from each node provided to proximal nodes of the at least one network of the at least one self-organizing computing machine include a reward information for definition of a policy determinative for calculation of the output values provided from each node to proximal nodes of the at least one network of the at least one self-organizing computing machine.

* * * * *